United States Patent [19]
Spencer et al.

[11] Patent Number: 5,869,802
[45] Date of Patent: Feb. 9, 1999

[54] PLASMA PRODUCING STRUCTURE

[75] Inventors: John E. Spencer, Plano; Robert Westmoreland, Richardson, both of Tex.; Thomas D. Mantei, Cincinnati, Ohio

[73] Assignees: PlasmaQuest, Inc., Richardson, Tex.; University of Cincinnati, Cincinnati, Ohio

[21] Appl. No.: 770,316

[22] Filed: Dec. 20, 1996

Related U.S. Application Data

[60] Provisional application No. 60/008,971, Dec. 2, 1995.
[51] Int. Cl.⁶ .................................................. B23K 10/00
[52] U.S. Cl. .............................. 219/121.48; 219/121.43; 219/121.41; 156/345
[58] Field of Search ........................... 219/121.4, 121.43, 219/121.44, 121.59; 156/345, 643.1, 646.1; 204/298.37, 298.38

[56] References Cited

U.S. PATENT DOCUMENTS

| | | | |
|---|---|---|---|
| 4,433,228 | 2/1984 | Nishimatsu et al. | 219/121 PG |
| 4,483,737 | 11/1984 | Mantei | 156/643 |
| 4,761,219 | 8/1988 | Sasaki et al. | 204/298.37 |
| 4,970,435 | 11/1990 | Tanaka et al. | 315/111.21 |
| 5,196,670 | 3/1993 | Mantei | 219/121.43 |

*Primary Examiner*—Mark Paschall
*Attorney, Agent, or Firm*—Carstens Yee & Cahoon

[57] ABSTRACT

A plasma producing device is furnished with a half height waveguide that transmits microwave energy through a window into an evacuated chamber, adjustable spacers controlling the distance between an opening of the waveguide and the window, and/or a return piece adjacent a permanent magnet producing the required magnetic field, preferably including sidewalls encompassing the permanent magnet. The improvements promote plasma uniformity at the workpiece by allowing smaller magnets to be employed, reducing stray magnetic fields outside the resonance zone, and facilitating transition of the microwaves from a rectangular transmission mode to a circular transmission mode outside the chamber. Facilitating transistion in this manner improves tuning or impedance matching.

16 Claims, 3 Drawing Sheets

| DISTANCE | a (G) | b (G) |
|---|---|---|
| 0 | 4600 | 230 |
| 1.0 | 3460 | 200 |
| 2.0 | 2278 | — |
| 3.0 | 1480 | 185 |
| 4.0 | 995 | — |
| 5.0 | 684 | — |
| 6.0 | 484 | 150 |
| 7.0 | 351 | — |
| 8.0 | 262 | — |
| 9.0 | 200 | — |
| 12.0 | 99 | 45 |

PLASMA PRODUCING STRUCTURE

CROSS-REFERENCE

This application is a continuation-in-part of provisional application 60/008,971, filed Dec. 21, 1995, which is incorporated herein by reference.

BACKGROUND OF THE INVENTION

1. Technical Field

The present invention relates generally to plasma devices and in particular to plasma devices used for etching a substrate or depositing material on a substrate. Still more particularly, the present invention relates to improvements reducing size and cost of a plasma producing device used in conjunction with a substrate while improving the uniformity of the plasma produced at the substrate workpiece.

2. Description of the Related Art

Plasma producing devices are commonly used in plasma assisted processing to etch geometries associated with device formation into a substrate or to deposit layers of material on the substrate. Such devices are disclosed in U.S. Pat. Nos. 5,196,670 and 4,483,737, which are incorporated herein by reference.

One class of plasma producing devices, described in U.S. Pat. No. 5,196,670, employs a magnetic field in conjunction with microwave energy. In these devices, plasma is produced from a working gas as a result of the interaction of a magnetic field with an electric field. A microwave waveguide is used to inject microwaves, which have an associated electric field, into an evacuable chamber containing the working gas. The microwaves propagate into the chamber in a direction substantially perpendicular to the surface of the substrate or workpiece. The electric field associated with the microwaves is perpendicular to the direction of propagation, radially outward from a line following the direction of propagation of the microwaves.

A magnetic field is provided, causing plasma electrons to rotate around the direction of propagation at right angles with the magnetic field. At the plane of resonance, the point at which the electric field and the rotation of plasma electrons are in phase, the microwave electric field constantly accelerates the rotating plasma electrons. The energy of this acceleration dissociates molecules of the working gas into atoms and removes electrons from the atoms, creating ions and additional electrons. The ions then diffuse and impinge upon the surface of the workpiece.

The requisite magnetic field may be provided by a single permanent magnet situated above the outlet of the microwave waveguide into the chamber. An adjusting element may be provided between the magnet and the waveguide to vary the spatial relationship between the magnet and the waveguide opening, thus altering the location of the plane of resonance or "resonance zone" within the chamber.

While use of a permanent magnet situated over the waveguide opening to the chamber has advantages over other plasma producing methods, a permanent magnet of the size required to provide the requisite magnetic field may be very expensive. Furthermore, no ability exists to shape, direct, or otherwise control the magnetic field produced by the permanent magnet, or to minimize stray magnetic fields around the magnet. Control over both the direction of the magnetic field produced by the permanent magnet and stray magnetic fields would be advantageous to improve plasma uniformity at the workpiece. Prior art attempts to obtain plasma uniformity have focused on achieving a uniform magnetic field, which requires very large and bulky magnets. It would be advantageous to minimize the magnetic field near the workpiece, resulting in an inherently uniform plasma.

Another drawback of the prior art use of permanent magnets in plasma producing devices relates to the microwave waveguide. Use of a standard waveguide constrains placement of the permanent magnet with respect to the chamber. As the magnet face is moved further from the chamber, larger, more expensive magnets are required to produce the requisite magnetic field. It would be advantageous, therefore, to be able to reduce the distance between the face of the permanent magnet and the chamber.

Additionally, the prior art teaches placement of the waveguide directly on a window in the evacuable chamber. Microwaves are thus transmitted directly from the waveguide into the chamber through the window, and transition from the rectangular transmission mode to the circular transmission mode inside the chamber. Thus, it would be advantageous to control placement of the waveguide opening relative to the chamber window to facilitate plasma uniformity and tuning.

SUMMARY OF THE INVENTION

A plasma producing device is furnished with a half height waveguide that transmits microwave energy through a window into an evacuated chamber, adjustable spacers controlling the distance between an opening of the waveguide and the window, and/or a return piece adjacent a permanent magnet producing the required magnetic field, preferably including sidewalls encompassing the permanent magnet. The improvements promote plasma uniformity at the workpiece by allowing smaller magnets to be employed, reducing stray magnetic fields outside the resonance zone, and facilitating transition of the microwaves from a rectangular transmission mode to a circular transmission mode outside the chamber. Facilitating transition in this manner improves tuning or impedance matching.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
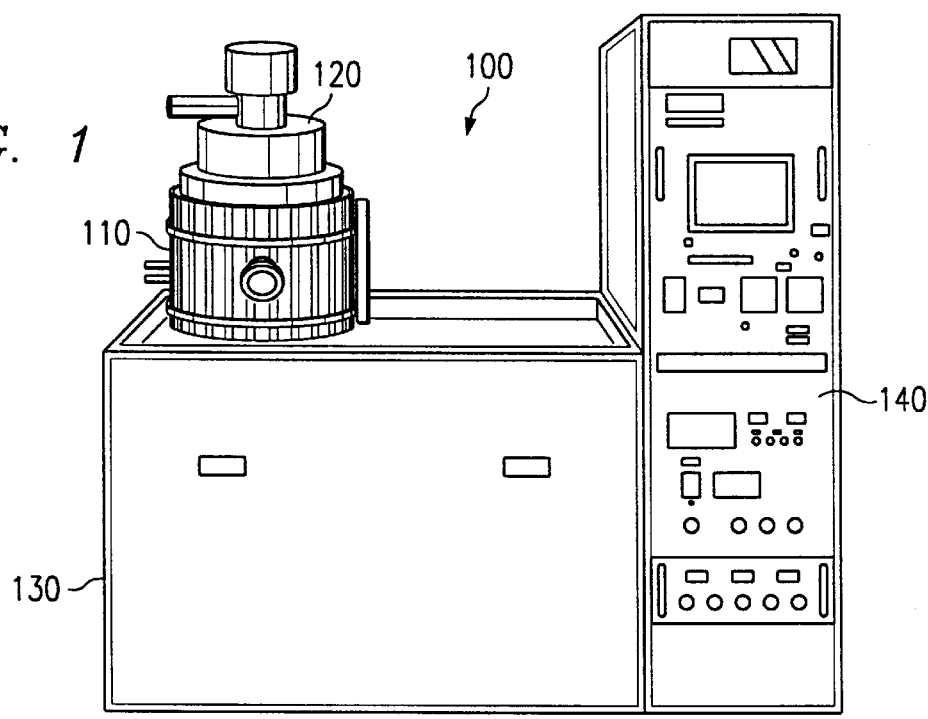
FIG. 1 depicts a pictorial representation of a processing reactor in which a plasma producing structure in accordance with a preferred embodiment of the present invention may be used.

With reference now to the figures, and in particular with reference to FIG. 1, a pictorial representation depicts a processing reactor in which a plasma producing structure may be used in accordance with a preferred embodiment of the present invention. Processing reactor 100 includes a processing chamber 110 on which is mounted plasma producing structure 120. Processing chamber 110 is partially contained within housing 130, which may also contain gas sources and other components. Control unit 140 provides controls necessary to operate processing reactor 100.

Figure 2:
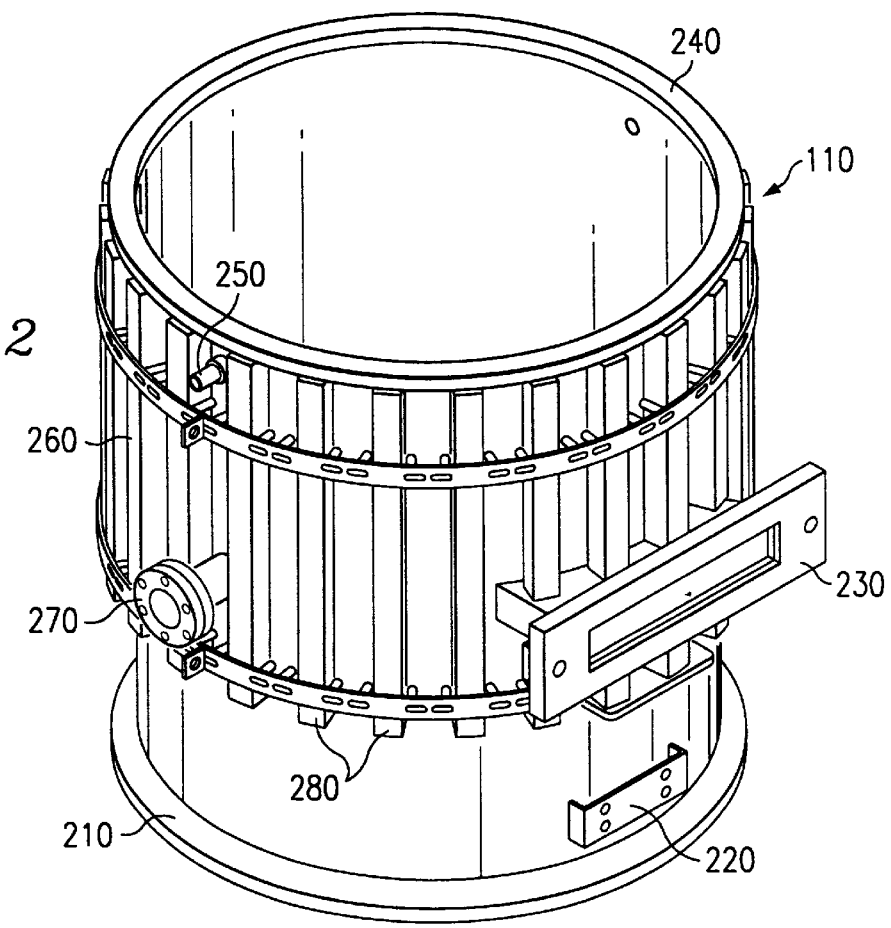
FIG. 2 is a pictorial representation of a processing chamber in accordance with a preferred embodiment of the present invention.

Referring to FIG. 2, a pictorial representation of a processing chamber in accordance with a preferred embodiment of the present invention is illustrated. Processing chamber 110 is an evacuable chamber which includes lower flange 210, mounts 220, wafer inlet port 230, upper flange 240, gas inlet 250, and viewport 270. Chamber 110 may be a cylindrical chamber constructed from stainless steel, aluminum, or another nonferromagnetic material and should be capable of withstanding evacuation to at least about $1\times10^{-6}$ Torr. Elongated permanent magnets 280 affixed to the side walls of processing chamber 110 around the periphery of chamber 12 may be placed in parallel relation to each other with adjacent magnets aligned to have opposite polarities, creating a surface magnetic field boundary confining plasma to the interior of chamber 110.

Figure 3:
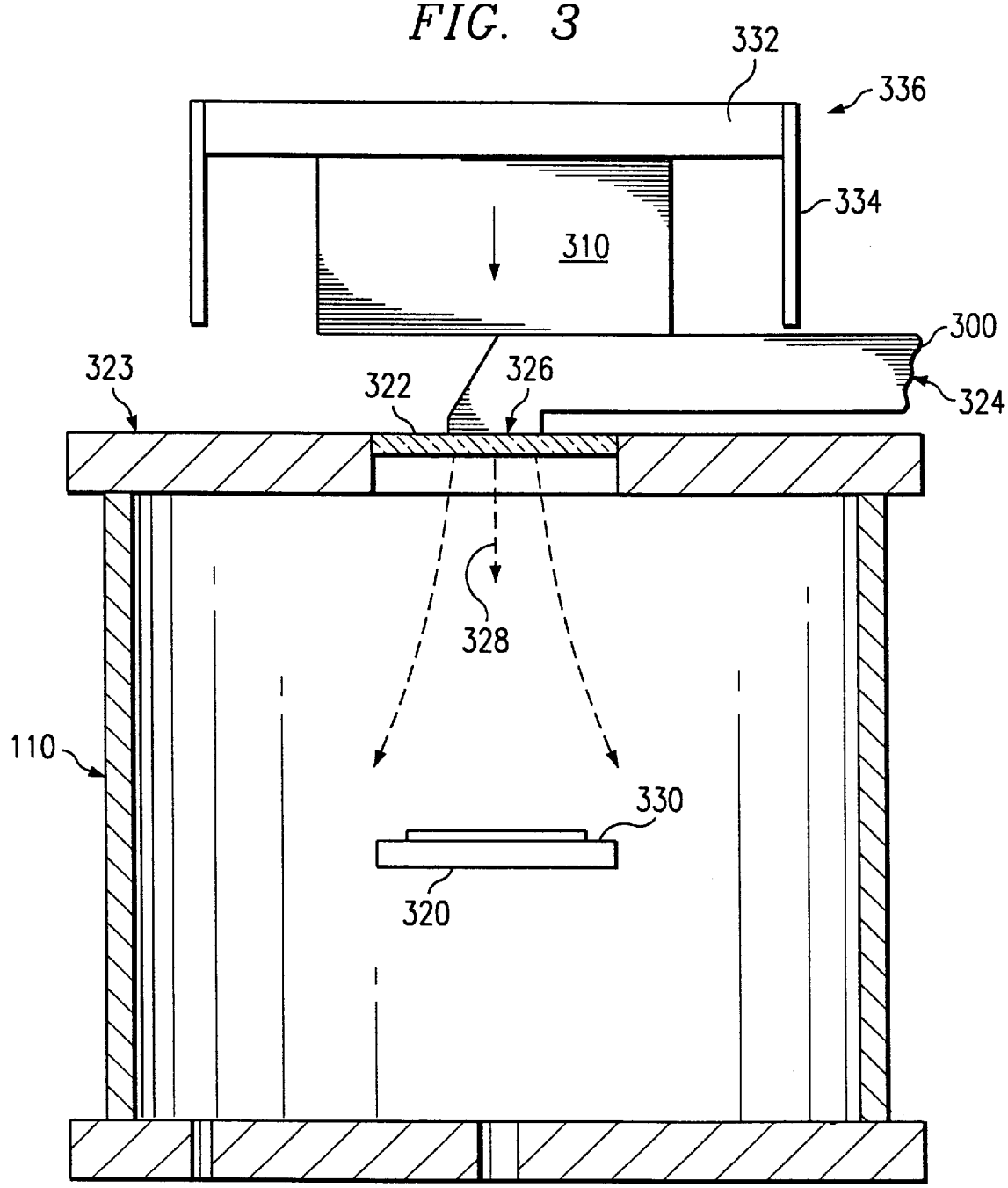
FIG. 3 depicts a pictorial representation of a plasma producing device in accordance with a preferred embodiment of the present invention.

With reference now to FIG. 3, a cross-sectional view of a portion of a plasma producing device in accordance with a preferred embodiment of the present invention is depicted. For clarity, the components depicted are not drawn to scale and some items of the total construction are not depicted, but are illustrated instead in a cross-sectional detail provided in FIG. 2.

The plasma producing device includes evacuable chamber 110 with a waveguide 300 situated adjacent chamber 110 and a permanent magnet 310 adjacent waveguide 300 opposite chamber 110. A support 320 for the workpiece is located in the interior of chamber 110. A window 322, constructed of material transparent to microwave radiation such as quartz or aluminum oxide, is located in an upper portion 323 of chamber 110. Waveguide 300, having a first end 324 connected to a microwave power generation source (not shown), conveys microwave energy produced by the generating source along its length to a second end 326, which is proximately situated to window 322. Waveguide 300 is preferably a rectangular waveguide and may be constructed from brass or aluminum. Microwave energy exiting waveguide 300 at exit opening 326 and propagating in free space will transition from a rectangular transmission mode to a circular transmission mode.

Waveguide 300 should be dimensioned according to the frequency of the microwaves to be transmitted. Microwaves having a frequency in the range of about 2.45 GHz have been found suitable for a plasma producing device in accordance with the present invention.

Microwaves exiting waveguide 300 pass through window 322 and enter chamber 110, propagating in a direction 328 substantially perpendicular to the support surface 330 of workpiece support 320. Workpiece support 320 may be electrically biased to create an electric field attracting plasma ions.

Permanent magnet 310 is positioned adjacent waveguide 300 with its polarity substantially aligned with the direction 328 of microwave propagation. Both magnet 310 and exit opening 326 of waveguide 300 are axially aligned with workpiece support 320. Microwave propagation from exit opening 326 of waveguide 300 is also aligned with a predominant axial magnetic field component produced by permanent magnet 310 which extends through waveguide 310 and microwave window 322 into chamber 110. A resonance zone is thus formed where the electric field associated with the microwaves is in phase with the magnetic field component, typically inside chamber 110 between microwave window 322 and workpiece support 320.

Magnet 310 may be composed of a magnetic compound such as neodymium-iron-boron (Nd—Fe—B) or samarium-cobalt (Sm—Co). Magnet 310 should be capable of producing a magnetic field of approximately 900 gauss near the resonance zone. Mounted on the top surface of magnet 310 is a return piece 332 constructed, for example, of soft iron. Return piece 332 preferably includes side extensions or sidewalls 334 to form a cylindrical sheath 336 encompassing magnet 310 to reduce stray magnetic fields.

Figures 4, 5:
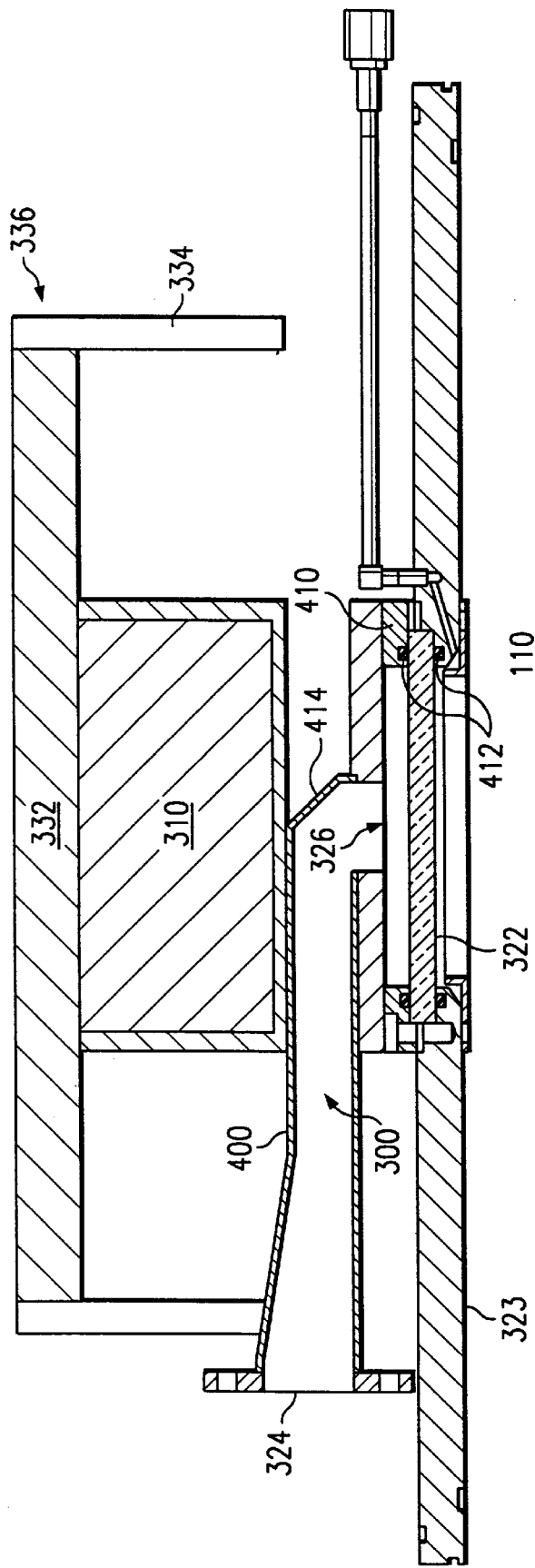
FIG. 4 is a detail of a portion of the plasma producing device depicted in FIG. 3 illustrating additional items of construction in accordance with a preferred embodiment of the present invention.
FIG. 5 depicts a table detailing exemplary magnetic field strengths at selected locations within and around the plasma producing device of the present invention.

Referring to FIG. 4, a detail of the plasma producing device is portrayed to show additional items of construction in accordance with a preferred embodiment of the present invention. In a preferred embodiment, waveguide 300 used to transport microwaves from the generating source to chamber 110 is a half height waveguide in the region where waveguide 300 intervenes between magnet 310 and chamber 110. As used herein, "half height" refers only to an example of a waveguide having any arbitrary vertical dimension other than the standard height. For 2.45 GHz microwaves, a generally used waveguide is WR284, with internal dimensions of 2.84 by 1.34 inches. The WR340 waveguide may also be employed, which has internal dimensions of 3.40 by 1.70 inches and a frequency range of 2.1 to 3.00 GHz.

The most important dimension for efficient transport of microwave energy in a rectangular waveguide is the horizontal (width) dimension. The vertical dimension (height) can be reduced without significant loss of efficiency or change of transmission mode. Thus waveguide 300 tapers from a standard sized waveguide at the generating source opening 324 to a waveguide having a smaller vertical dimension at a point 400 approaching magnet 310. The waveguide may, for example, be literally half the height of a standard waveguide. However, any partial height which places the magnet closer to the discharge while maintaining acceptable power levels and transmission distances is suitable.

Use of a half height waveguide in the region adjacent magnet 310 allows magnet 310 to be positioned closer to chamber 110. Because magnetic field strength decreases with distance from the magnet, a smaller, less-expensive magnet may be employed, producing a magnetic field which is less strong and consequently reducing stray magnetic fields at the workpiece.

Reduction of the distance between magnet 310 and chamber 110 may alternatively be accomplished by employing a dielectrically loaded waveguide. The interior volume of the waveguide is normally air, which has a dielectric constant of 1. If the waveguide were filled with a material having a higher dielectric constant, such as Teflon®, a smaller waveguide may be employed. The required waveguide dimensions are scaled from the inverse of the square root of the dielectric constant.

The position of exit opening 326 of waveguide 300 with respect to window 322 is controlled by adjustable spacers 410. Gaskets 412 between window 322, spacers 410, and the upper portion 323 of chamber 110 insure the integrity of the evacuable chamber. Adjustable spacers 410 allow control over the uniformity of the plasma generated by the microwaves. In the prior art, the rectangular waveguide opening was placed in direct contact with the microwave window. Microwaves were thus transmitted directly from waveguide 300 through window 322 into chamber 110. The transition of the microwave energy from the rectangular $TE_{10}$ transmission mode to the circular $TE_{11}$ transmission mode occurred below microwave window 322 in a plasma excitation region within chamber 110. However, to maximize uniformity of the plasma generated by the microwave energy, the microwave power should form an approximately uniform disk at the region of plasma production. It is preferable, therefore, that the transition from the rectangular transmission mode to the circular transmission mode occur between the mitered elbow 414 of waveguide 300 and dielectric microwave window 322 in chamber 110.

To facilitate the transition as described above, spacers 410 permit adjustment of the distance between exit opening 326 of waveguide 300 and microwave window 322. Adjustment of spacers 410 facilitates impedance matching of the microwave power to the load. Spacers 410 serve to optimize coupling of microwave energy between the waveguide and the chamber, facilitating tuning and optimizing characteristics of the resonance zone such as placement, modes, and shape. Once optimized for a specific embodiment, the space may remain fixed and requires no further adjustment.

The preferred opening through spacers 410 is either circular of approximately the same diameter as microwave window 322 or rectangular of approximately the dimensions of exit opening 326 in waveguide 300. By adjusting spacers 410, the transition of the microwaves from the rectangular mode to the circular mode can be optimized before the microwaves enter chamber 110, thus optimizing both plasma uniformity and plasma tuning.

Return piece 332 mounted on the top surface of magnet 310 is employed to compensate for magnetic flux and reflects or short circuits the magnetic field above magnet 310, doubling the effective height of magnet 310. This allows magnet 310 to produce a magnetic field having the strength equal to that produced by a similar magnet (without the return piece) of twice the height. For example, a magnet 6 inches in width and length by 3 inches in height can, with an appropriate return piece, perform the work of a magnet cube 6 inches on each side. A smaller magnet 310 may thus be employed for producing a magnetic field at the resonance zone. Since the magnetic materials used for magnet 310 are very expensive, this improves the commercial viability of the plasma producing device. Employing a return piece also reduces stray magnetic fields above magnet 310 and return piece 332.

Return piece 332, typically composed of soft iron, must be dimensioned so that it is not saturated with magnetic field. The magnetic flux density in return piece 332 should not be higher than the saturation value of the magnetic flux density of the material of construction of the return piece. Stated in a different manner, $$B_{magnet} \times A_{magnet} = B_{return} \times A_{return} \qquad (1)$$

where $B_{magnet}$ is the magnetic flux density at the magnet face, $A_{magnet}$ is the area of the magnet face, $B_{return}$ is the magnetic flux density in the return piece, and $A_{return}$ is the cross-sectional area of the return piece. For example, in the case of a cylindrical return piece on the magnet, where $A_{return}$ is pi times the diameter of the magnet times the height or thickness of the return piece, the height or thickness of the return piece should be such that $B_{return}$ is maintained below the saturation value of the return piece material; for soft iron, the saturation flux density may generally be estimated at approximately 1 Telsa.

With reference now to FIG. 5, a table detailing exemplary magnetic field strengths at selected locations within and around the plasma producing device of the present invention is depicted. The magnetic field is necessary only to produce the resonance zone within plasma chamber 110. Stray magnetic fields (i.e., any magnetic field outside the resonance zone) may divert the plasma since plasma electrons and ions will tend to follow magnetic field lines. Therefore, it is advantageous to minimize stray fields to allow plasma to diffuse freely outside of the resonance zone. Stray magnetic fields above magnet 310 are suppressed by return piece 332.

Table 500 in FIG. 5 provides typical magnetic field strengths at various positions relative to the assembly comprising magnet 310 and return piece 332. The distance in table 500 is in inches; a represents a point along the common axis of the magnet 310/return piece 332 combination which is the corresponding distance from the polar surface of magnet 310 adjacent waveguide 300; b represents a point along the same common axis which is a corresponding distance from the surface of return piece 332 opposite the surface adjoining magnet 310. The values given for a and b are magnetic field in gauss (G). These values demonstrate reduction of stray magnetic fields above the return piece 332/magnet 310 assembly by return piece 332. In the example described above, the magnetic field is approximately 875 gauss at the resonance zone, which is about 4 to 4½ inches from the polar surface of magnet 310 adjacent waveguide 300.

Referring again to FIG. 4, return piece 332 preferably but not necessarily includes sidewalls 334, also constructed of soft iron. Placing soft iron components in proximity to magnet 310 at locations near the resonance plane will direct the magnetic field into the resonance zone.

Sidewalls 334 should also be dimensioned so as not to be saturated with magnetic field. As with return piece 332 described above, the dimensions are selected to prevent the magnetic flux density from exceeded the saturation flux density for the material employed.

Sidewalls 334 condition the magnetic field contours near the microwave window, directing the magnetic field into the resonance zone. Return piece assembly 336 is preferably cylindrical with an annular cavity at one end. Magnet 310 is received by the annular cavity, with sidewalls 334 extending to the plane of the polar face of magnet 310 adjacent waveguide 300.

By virtue of the half height waveguide and the return piece, the invention described allows the use of smaller, less expensive permanent magnets for creating the resonance plane in a plasma producing device. The use of smaller magnets is accompanied by an attendant reduction is stray magnetic fields, improving plasma uniformity at the workpiece. Plasma uniformity may be still further improved by optimization of microwave power delivered to the resonance plane, which is achieved through spacers adjusting the distance between the waveguide opening and the microwave window on the plasma chamber. The microwave energy delivered by the waveguide transitions from the rectangular transmission mode to the circular transmission mode outside the plasma chamber. The spacers facilitate impedance matching of the microwave power to the load in the resonance zone, optimizing both plasma uniformity and plasma tuning. The present invention is thus capable of generating plasma densities greater than $10^{11}$ cm$^{-3}$, ion current densities above 10 mA/cm$^2$, and a one-sigma plasma parameter uniformity of approximately 1% across a 200 mm substrate.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A plasma producing structure, comprising:

a waveguide delivering microwave energy and an associated electric field along a path through a window permitting microwave transmission therethrough;

a permanent magnet adjacent to a portion of the waveguide, the permanent magnet having a polarity substantially aligned with the path of the microwave energy through the window so that a predominant axial magnetic field component produced by the permanent magnet extends along the path;

a return piece adjacent the permanent magnet opposite the waveguide and adjustable spacers between the waveguide and the window, wherein a distance between an opening of the waveguide and the window may be altered.

2. The plasma producing structure of claim 1, wherein electrons rotating around the magnetic field component are in phase with the electric field associated with the microwave energy within a resonance zone.

3. The plasma producing structure of claim 2, wherein the waveguide is a partial height waveguide.

4. The plasma producing structure of claim 1, wherein a distance between an opening of the waveguide and the window is adjustable.

5. The plasma producing structure of claim 1, wherein the microwave energy transitions from a rectangular transmission mode to a circular transmission mode between the opening of the waveguide and the window.

6. A plasma producing structure, comprising:

a partial height waveguide delivering microwave energy and an associated electric field along a path through an aperture permitting microwave transmission therethrough;

a permanent magnet adjacent to a portion of the waveguide, the permanent magnet having a polarity substantially aligned with the path of the microwave energy through the aperture so that a predominant axial magnetic field component produced by the permanent magnet extends along the path; and adjustable spacers between the waveguide and the aperture, wherein a distance between an opening of the waveguide and the aperture may be altered.

7. The plasma producing structure of claim 6, wherein electrons rotating around the magnetic field component are in phase with the electric field associated with the microwave energy within a resonance zone.

8. The plasma producing structure of claim 6, further comprising:

a return piece adjacent the permanent magnet opposite the waveguide.

9. The plasma producing structure of claim 6, wherein a distance between an opening of the waveguide and the window is adjustable.

10. The plasma producing structure of claim 6, wherein the microwave energy transitions from a rectangular transmission mode to a circular transmission mode between the opening of the waveguide and the aperture.

11. A plasma producing structure, comprising:

a waveguide delivering microwave energy and an associated electric field along a path through a window permitting microwave transmission therethrough;

a permanent magnet adjacent to a portion of the waveguide, the permanent magnet having a polarity substantially aligned with the path of the microwave energy through the window so that a predominant axial magnetic field component produced by the permanent magnet extends along the path; and adjustable spacers between the waveguide and the window controlling a distance between an opening of the waveguide and the window.

12. The plasma producing structure of claim 11, wherein a predominant axial magnetic field component produced by the permanent magnet is perpendicular to the electric field associated with the microwaves and extends into the chamber to generate a resonance zone within said chamber.

13. The plasma producing structure of claim 11, further comprising:

a return piece adjacent the permanent magnet opposite the waveguide.

14. The plasma producing structure of claim 11, wherein the waveguide comprises a partial height waveguide.

15. The plasma producing structure of claim 11, wherein the microwave energy transitions from a rectangular transmission mode to a circular transmission mode between the opening of the waveguide and the window.

16. A method of producing plasma, comprising:

transmitting microwave energy and an associated electric field via a partial height waveguide along a path through a window permitting microwave transmission therethrough;

adjusting the distance from an opening of the waveguide to the window to permit the microwave energy to transition from a rectangular transmission mode to a circular transmission mode between the opening of the waveguide and the window; and projecting a magnetic field component produced by a permanent magnet and an adjacent return piece along the path, the magnetic field component aligned substantially perpendicular to the electric field associated with the microwave energy, wherein a resonance zone is generated.

* * * * *